(12) United States Patent
Chen et al.

(10) Patent No.: US 10,509,156 B2
(45) Date of Patent: Dec. 17, 2019

(54) LIGHT EMITTING DEVICES

(71) Applicant: Excellence Optoelectronics Inc., Miaoli (TW)

(72) Inventors: Yu-Chu Chen, Yunlin (TW);
Ching-Tan Yu, Hsinchu (TW);
Pin-Chu Chen, Miaoli (TW);
Sheng-Hua Yang, Taichung (TW)

(73) Assignee: Excellence Optoelectronics Inc., Miaoli (TW)

(*) Notice: Subject to any disclaimer, the term of this patent is extended or adjusted under 35 U.S.C. 154(b) by 271 days.

(21) Appl. No.: 15/587,418

(22) Filed: May 5, 2017

(65) Prior Publication Data

US 2018/0188438 A1 Jul. 5, 2018

(30) Foreign Application Priority Data

Jan. 3, 2017 (TW) .............................. 106100028 A

(51) Int. Cl.
*F21V 8/00* (2006.01)
*F21S 41/24* (2018.01)
(Continued)

(52) U.S. Cl.
CPC .......... *G02B 6/0035* (2013.01); *B60Q 1/0011* (2013.01); *B60Q 1/22* (2013.01); *B60Q 1/30* (2013.01); *B60Q 1/34* (2013.01); *B60Q 1/44* (2013.01); *B60Q 1/48* (2013.01); *B60Q 1/56* (2013.01); *B60Q 3/00* (2013.01); *F21S 41/141* (2018.01); *F21S 41/24* (2018.01); *F21S 43/14* (2018.01); *F21S 43/239* (2018.01);
(Continued)

(58) Field of Classification Search
CPC .............................. G02B 6/0021; G02B 6/002
See application file for complete search history.

(56) References Cited

U.S. PATENT DOCUMENTS 5,050,946 A 9/1991 Hathaway
5,640,483 A 6/1997 Lin
(Continued)

FOREIGN PATENT DOCUMENTS

CN 103176239 6/2013
CN 104246360 12/2014
(Continued)

OTHER PUBLICATIONS

Communication Pursuant to Article 94(3) EPC.
(Continued)

*Primary Examiner* — Anh T Mai
*Assistant Examiner* — Zachary J Snyder
(74) *Attorney, Agent, or Firm* — Eastwind Consultants Co., Ltd.; Jenny Chen

(57) ABSTRACT

The present invention discloses a light emitting device. The device may include a printed circuit board, a reflective layer formed on the printed circuit board, a light guide layer formed on the reflective layer, and one or more light sources provided on one or more sides of the light guide layer to allow light to enter the light guide layer from the one or more sides, wherein the light guide layer may be bent with one or more curves, and wherein one surface of the light guide layer may be formed with a plurality of microstructures so as to achieve the best lighting effect and to increase luminance uniformity.

38 Claims, 4 Drawing Sheets

(51) Int. Cl.

| | |
|---|---|
| *F21S 43/14* | (2018.01) |
| *F21S 43/239* | (2018.01) |
| *F21S 41/141* | (2018.01) |
| *B60Q 1/00* | (2006.01) |
| *B60Q 1/22* | (2006.01) |
| *B60Q 1/30* | (2006.01) |
| *B60Q 1/34* | (2006.01) |
| *B60Q 1/44* | (2006.01) |
| *B60Q 1/48* | (2006.01) |
| *B60Q 1/56* | (2006.01) |
| *B60Q 3/00* | (2017.01) |
| *F21Y 115/10* | (2016.01) |

(52) U.S. Cl.
CPC ......... *G02B 6/0021* (2013.01); *G02B 6/0031* (2013.01); *G02B 6/0073* (2013.01); *B60Q 2400/30* (2013.01); *F21Y 2115/10* (2016.08); *G02B 6/0051* (2013.01)

(56) References Cited

U.S. PATENT DOCUMENTS

| | | | |
|---|---|---|---|
| 6,951,414 B2 | 10/2005 | Amano | |
| 8,255,943 B2 | 9/2012 | German | |
| 8,349,225 B2 | 1/2013 | Yue | |
| 8,858,025 B2 | 10/2014 | Park et al. | |
| 8,979,350 B2 | 3/2015 | Wang He | |
| 9,250,380 B2 | 2/2016 | Hsieh et al. | |
| 2005/0122591 A1 | 6/2005 | Parker | |
| 2006/0256442 A1 | 11/2006 | Hasel | |
| 2008/0186726 A1* | 8/2008 | Okada ................. | B60Q 1/0041 362/509 |
| 2008/0316601 A1 | 12/2008 | Hwang et al. | |
| 2009/0147353 A1* | 6/2009 | Yang ................... | G02B 6/0036 359/350 |
| 2013/0148378 A1 | 6/2013 | Xiang-Dong | |
| 2013/0188910 A1 | 7/2013 | Tokushima | |
| 2015/0029747 A1* | 1/2015 | Hsieh .................. | G02B 6/0055 362/607 |
| 2015/0036336 A1* | 2/2015 | Yang ................... | G02B 6/0021 362/235 |
| 2015/0098227 A1* | 4/2015 | Yang ................... | B60Q 1/2607 362/301 |
| 2016/0146420 A1* | 5/2016 | Yang ................... | G02B 6/0053 362/516 |

FOREIGN PATENT DOCUMENTS

| | | |
|---|---|---|
| CN | 104566112 | 4/2015 |
| CN | 106152013 | 11/2016 |
| JP | 2001-28203 | 1/2001 |
| JP | 2004-22347 | 1/2004 |
| JP | 2006-156324 | 6/2006 |
| JP | 2007-95603 | 4/2007 |
| JP | 2008-140698 | 6/2008 |
| JP | 2011-9125 | 1/2011 |
| JP | 2012-204192 | 10/2012 |
| TW | 556843 | 10/2003 |
| TW | I323704 | 4/2010 |
| TW | M408517 | 8/2011 |
| TW | M467580 | 12/2013 |
| TW | I522663 | 2/2016 |

OTHER PUBLICATIONS

Japanese Patent Office Final Decision of Refusal.
Taiwan Office Communication.
Chinese Office Action.

\* cited by examiner

| Test Point | H | V | Analysis (cd) |
|---|---|---|---|
| 10U-5L | -5 | 10 | 58.60 |
| 5U-20L | -20 | 5 | 58.55 |
| 5D-20L | -20 | -5 | 58.38 |
| 10D-5L | -5 | -10 | 56.28 |
| 5U-10L | -10 | 5 | 58.64 |
| H-10L | -10 | 0 | 58.79 |
| 5D-10L | -10 | -5 | 58.35 |
| 5U-V | 0 | 5 | 58.12 |
| H-5L | -5 | 0 | 58.62 |
| H-V | 0 | 0 | 57.86 |
| H-5R | 5 | 0 | 55.90 |
| 5D-V | 0 | -5 | 56.88 |
| 5U-10R | 10 | 5 | 55.38 |
| H-10R | 10 | 0 | 54.44 |
| 5D-10R | 10 | -5 | 53.01 |
| 10U-5R | 5 | 10 | 57.50 |
| 5U-20R | 20 | 5 | 48.93 |
| 5D-20R | 20 | -5 | 45.02 |
| 10D-5R | 5 | -10 | 53.61 |

| Test Point | H | V | Analysis (cd) |
|---|---|---|---|
| 10U-5L | -5 | 10 | 63.73 |
| 5U-20L | -20 | 5 | 61.40 |
| 5D-20L | -20 | -5 | 64.00 |
| 10D-5L | -5 | -10 | 66.82 |
| 5U-10L | -10 | 5 | 63.86 |
| H-10L | -10 | 0 | 64.99 |
| 5D-10L | -10 | -5 | 66.08 |
| 5U-V | 0 | 5 | 66.88 |
| H-5L | -5 | 0 | 67.31 |
| H-V | 0 | 0 | 67.87 |
| H-5R | 5 | 0 | 67.38 |
| 5D-V | 0 | -5 | 67.81 |
| 5U-10R | 10 | 5 | 64.15 |
| H-10R | 10 | 0 | 64.41 |
| 5D-10R | 10 | -5 | 63.01 |
| 10U-5R | 5 | 10 | 65.26 |
| 5U-20R | 20 | 5 | 54.03 |
| 5D-20R | 20 | -5 | 50.45 |
| 10D-5R | 5 | -10 | 63.80 |

LIGHT EMITTING DEVICES

This application is related to and claims priority to a Taiwan patent application, Application Number 106100028, filed on Jan. 3, 2017, by the applicant Excellence Optoelectronics Inc., entitled "Light Emitting Devices."

FIELD OF THE INVENTION

The present invention relates to light emitting devices; more particularly, the present invention relates to light emitting devices utilizing LEDs as light sources. The light emitting device of the present invention is bendable, and the plurality of microstructures within the light emitting device is arranged in such a way to achieve luminance uniformity.

BACKGROUND OF THE INVENTION

As the technology of light emitting diodes (LEDs) becomes mature, the application has also widened. Currently, many car manufacturing companies have been using LEDs as light sources on their products. However, LEDs emit spot lights. The characteristics of spot lights make it hard for emitting lights to achieve luminance uniformity. Consequently, drivers on the opposite lane may experience discomfort due to glare.

Also, conventional backlight modules are mostly utilized on rectangular and flat light sources. And thus, applying the conventional backlight module on a vehicle has many restrictions on design, because new vehicular light sources are designed with a variety of modern and compact shapes. Moreover, the conventional backlight modules for LEDs are not bendable. Thus, the overall size of the vehicular light would be inevitably big.

Therefore, what is needed is a light emitting device capable of enhancing luminance uniformity when LEDs are used as light sources. What is also needed is a light emitting device with improved visual comfort and can direct lights according to government regulations.

SUMMARY OF THE INVENTION

In light of the drawbacks of the current arts, one aspect of the present invention is to provide a bendable light emitting device. In accordance with one embodiment of the present invention, the light emitting device may include a printed circuit board; a reflection layer formed on the printed circuit board; a light guide layer formed on the reflection layer; and one or more light sources formed on one or more sides of the light guide layer to allow light to enter the light guide layer from the one or more sides, wherein the light guide layer can be bent with one or more curves; and one surface of the light guide layer is formed with a plurality of microstructures arranged in such a way to achieve the best lighting effect and to increase luminance uniformity.

Another aspect of the present invention is to provide a light emitting device with a bendable microstructure layer. In one embodiment of the present invention, the device may include a printed circuit board; a reflection layer formed on the printed circuit board; a light guide layer formed on the reflection layer; and one or more light sources provided on one or more sides of the light guide layer to allow light to enter the light guide layer from the one or more sides; and a bendable microstructure layer formed above or below the light guide layer, wherein the bendable microstructure layer has a plurality of microstructures on a surface thereof, each of the microstructures has a first shape or a second shape assembled on the surface based on an overall shape of the bendable microstructure layer, and wherein the first shape has at least one curved surface and the second shape has at least one flat surface to achieve light enhancement and light deflection effects.

Yet another aspect of the present invention is to provide a vehicular light emitting device. The vehicular light emitting device of the present invention may include a printed circuit board electrically coupled to a vehicle body; a reflection layer formed on the printed circuit board; a light guide layer formed on the reflection layer; one or more light sources provided on one or more sides of the light guide layer to allow light to enter the light guide layer from the one or more sides; and a protective housing connecting the vehicle body to cover the printed circuit board, the reflection layer, the one or more light sources, and the light guide layer, wherein the light guide layer can be bent with one or more curves, and wherein one surface of the light guide layer is formed with a plurality of microstructures arranged based on a shape of the protective housing to achieve the best lighting effect.

DETAILED DESCRIPTION OF THE INVENTION

Reference will now be made in detail to the embodiments of the present invention. Examples of embodiments are illustrated in the accompanying drawings, wherein like reference numbers refer to like elements throughout the specification.

The present invention discloses a light emitting device. In one embodiment of the present invention, the light emitting device may have a bendable light guide layer. One surface of the bendable light guide layer may be provided with a plurality of microstructures. The microstructures are arranged with the same shape or different shapes next to each other based on the curve or curves of the light guide layer to achieve the best lighting effect.

Figure 1:
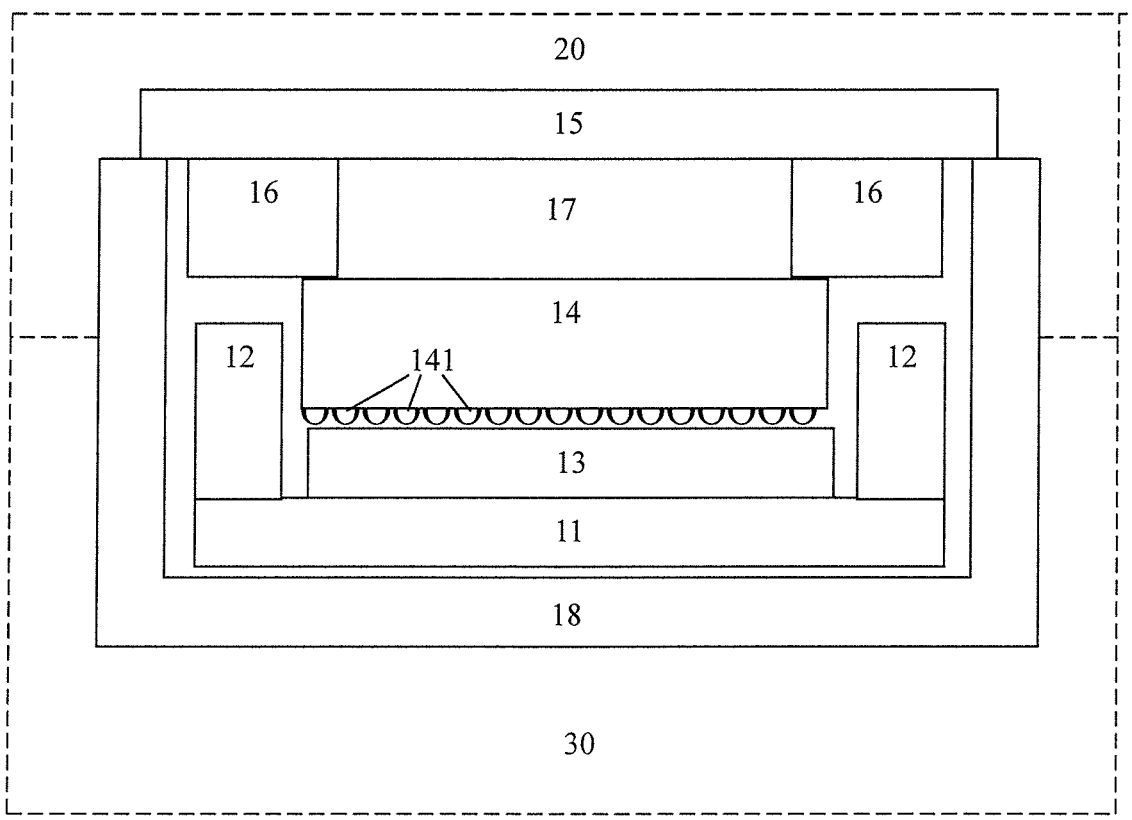
FIG. 1 illustrates a schematic diagram of a light emitting device in accordance with one embodiment of the present invention.

Refer to FIG. 1. FIG. 1 illustrates a schematic diagram of a light emitting device 10 in accordance with one embodiment of the present invention. The light emitting device 10 of the present invention may be a tail light, a brake light, a directional light, a reverse light, a daytime running light, a parking light, a license plate light, an indoor light, or any vehicular light. Alternatively, the light emitting device 10 of the present invention may be installed on any device that emits directional lights, such as traffic signal lights, etc. However, those skilled in the art would understand that the light emitting device 10 of the present invention is not limited to the above-mentioned lights. Any light emitting device that has a bendable light guide layer and/or a light guide layer that has a plurality of microstructures with the same shape or different shapes arranged based on the bending curves of the light guide layer to achieve the best lighting effect all falls within the scope of the present invention.

As shown in FIG. 1, the light emitting device 10 of the present invention may include a printed circuit board 11. In one embodiment of the present invention, the printed circuit board 11 may be electrically coupled to an external electronic device (not shown). In the embodiment where the light emitting device 10 is a vehicular lighting device, the printed circuit board 11 may be electrically coupled to an electronic device within a vehicle body 30. As such, a driver may control the light emitting device 10 of the present invention through the electronic device within the vehicle body 30.

In one embodiment of the present invention, the printed circuit board 11 may be installed with one or more light sources 12. In one preferred embodiment, the light source 12 of the present invention may be a light emitting diode (LED). In such embodiment, it is ideal that the LED emits lights from the side. However, those skilled in the art would know any other types of light source would also fall within the scope of the present invention.

The light emitting device 10 of the present invention may also include a reflection layer 13. In one embodiment of the present invention, the reflection layer 13 may be formed on top of the printed circuit board 11 so as to reflect lights. In one example, the reflection layer 13 of the present invention may be formed with highly reflective materials. For example, a highly reflective coating layer may be coated on the printed circuit board 11. In another example, a highly reflective strip may be stacked on top of the printed circuit board 11 to provide reflection. However, those skilled in the art would know any materials capable of highly reflecting the light from the light source 12 may fall within the scope of the present invention.

As shown in FIG. 1, the light emitting device 10 of the present invention may further include a light guide layer 14 to guide the light coming from one or more light sources 12 within the layer. In one embodiment of the present invention, the light guide layer 14 may be formed on the reflection layer 13, and one or more light sources 12 are located on two sides of the light guide layer 14. In other words, the light coming from the one or more light sources 12 comes into the light guide layer 14 from the sides.

Figure 2:
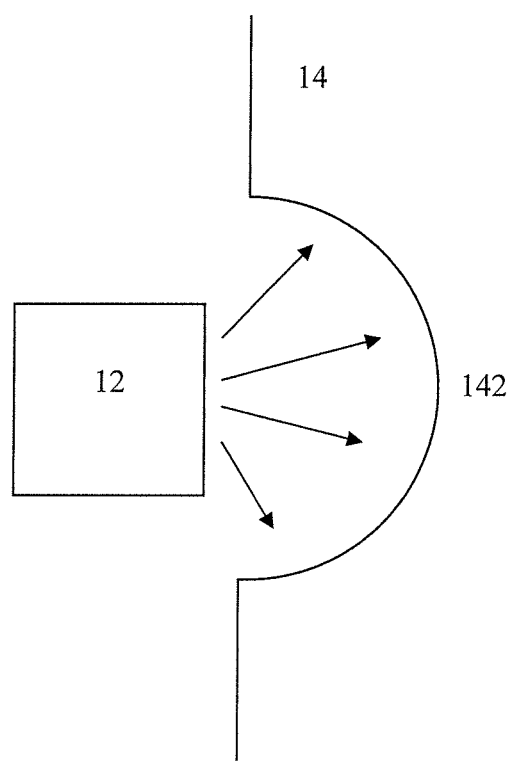
FIG. 2 illustrates a schematic diagram of a side of the light emitting device in accordance with one embodiment of the present invention.

Refer to FIG. 2, which is a schematic diagram of the light guide layer 14 in accordance with one embodiment of the present invention. In this embodiment, the sides of the light guide layer 14 may have a respective light entering surface with a concave shape. As such, total reflection caused by the light entering surface 142 may be reduced. On the other hand, the light emitting angle of the light source 12 may be increased, thereby reducing dark spots between light sources 12.

Refer back to FIG. 1. In one embodiment of the present invention, a surface of the light guide layer 14 may include a plurality of microstructures 141. In one embodiment, the plurality of microstructures 141 may be formed on a bottom surface of the light guide layer 14. In other words, the plurality of microstructures 141 may be formed between the light guide layer 14 and the reflection layer 13. However, in another embodiment, the microstructure layer 141 may be formed on a top surface of the light guide layer 14, that is, between the light guide layer 14 and an air layer 17.

The microstructure layer 141 of the present invention may be used to break the light from total reflection. The layer 141 may also be used to generate diffusion and change the path of light to concentrate light toward the axis of the light exiting surface, thereby increasing uniformity and strength of light. In one embodiment of the present invention, the microstructures 141 on the light guide layer 14 may have the same three dimensional shape or different three dimensional shapes, including but not limited to, a globe shape, an oval ball shape, a cone shape, a columnar shape, or a flat-topped cone shape, etc. In another embodiment of the present invention, the microstructures 141 may include a protruding and/or concave shape structure. In accordance with the present invention, different shapes of microstructures 141 may have different functions. For example, a globe-shaped microstructure 141 may be used to increase efficiency and uniformity of forward directional light. Therefore, the globe-shaped microstructure may also be called a forward directional microstructure. In another example, a cone-shaped microstructure 141 may be used to change the light path based on the angle of each surface, and thus may be called a deflecting microstructure.

Figure 3A:
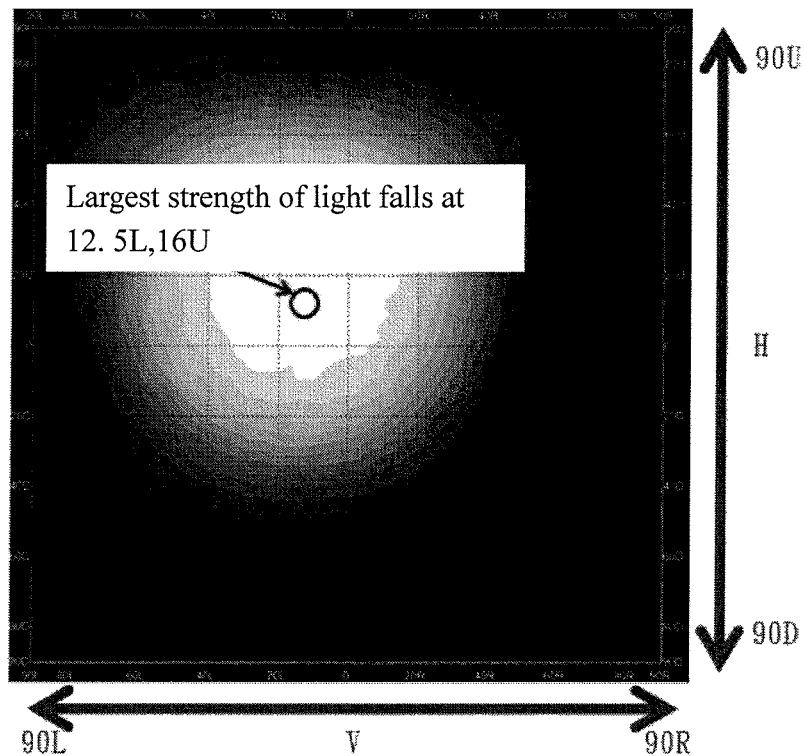
FIGS. 3a and 3b illustrate a simulation diagram of light distribution and a list of test point results of a forward directional microstructure and a deflecting microstructure, respectively, in accordance with one embodiment of the present invention.
Figure 3B:
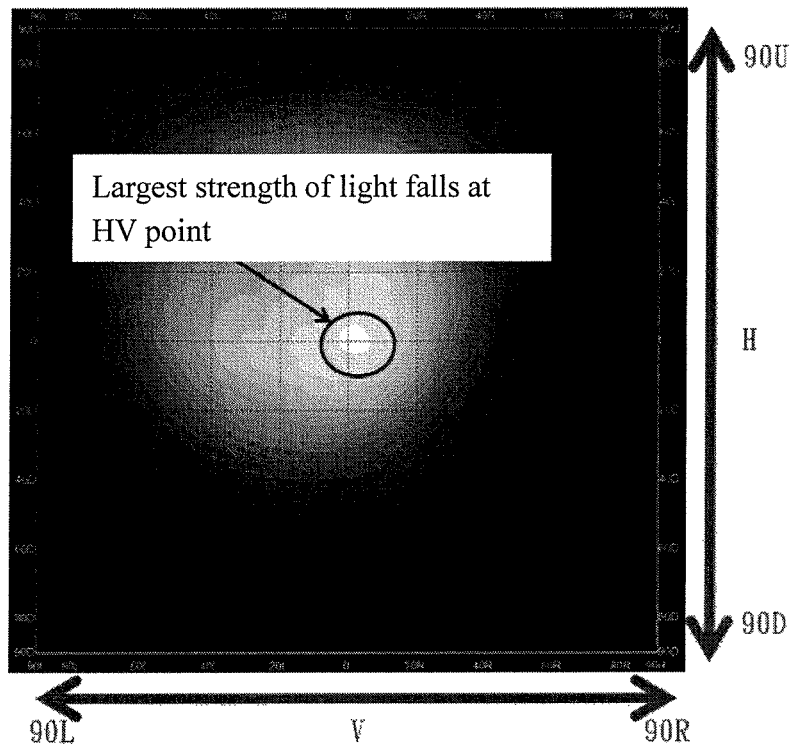

Refer now to FIGS. 3a and 3b, which illustrate a simulation diagram of light distribution and a list of test point results of a forward directional microstructure and a deflecting microstructure, respectively, in one embodiment of the present invention. As shown in FIG. 3a, the forward directional microstructure of the present invention allows the maximum strength of light to fall on left 12.5° and top 16°. At H-V point (0°,0°), the strength of light is 57.86 cd. In an environment filled with deflecting microstructures, the maximum strength of light may be adjusted to fall at H-V point (0°,0°) with a strength of 67.87 cd, as shown in FIG. 3b. As such, the deflecting microstructure of the present invention may concentrate the light and increase the strength of the outgoing light.

In one embodiment of the present invention, the light guide layer 14 may be made with a bendable material. For example, the light guide layer 14 of the present invention may be made with silicon and/or any other transparent optical material. Based on the curves of the light guide layer 14, the plurality of microstructures on the surface of the light guide layer 14 may be arranged with one shape or different shapes next to each other, such as the forward directional or deflecting microstructures, so as to enhance the efficiency of the forward directional light and/or luminance uniformity. For example, more deflecting microstructures 141 may be placed in the light guide layer 14 where larger curves occur so as to change the light path and increase the strength of outgoing light on the axis. On the other hand, more forward directional microstructures 141 may be placed in the light guide layer 14 where smaller curves occur so as to increase the efficiency and uniformity of forward directional light.

In another embodiment of the present invention, the plurality of microstructures 141 may be formed as an independent layer on top or bottom of the light guide layer 14. In such embodiment, the microstructure layer formed by the plurality of microstructures 141 may be made of a bendable material. The microstructures 141 on the microstructure layer may be one type or different types of microstructures (such as a forward directional or deflecting microstructure) arranged in such a way to increase the efficiency of forward directional light. For example, more deflecting microstructures 141 may be placed in the microstructure layer where larger curves occur so as to change the light path and increase the strength of outgoing light on the axis. On the other hand, more forward directional microstructures 141 may be placed in the microstructure layer where smaller curves occur so as to increase the efficiency and uniformity of forward directional light on the light guide layer 14. In one embodiment of the present invention, the microstructure layer may be formed on a top surface or a bottom surface of the light guide layer 14 so as to assist the light guiding capability of the light guide layer 14.

In one embodiment of the present invention, the light emitting device 10 may also include a diffusion layer 15 on the light guide layer 14, as shown in FIG. 1. The diffusion layer 15 of the present invention may be a diffusion strip or any plastic strip coated with diffusion material. However, those skilled in the art would understand any material capable of uniformly diffusing light may fall within the scope of the present invention. In one embodiment of the present invention, the diffusion layer 15 may include a light enhancement layer (not shown) and/or deflection layer (not shown) so as to adjust the lighting effects.

In one embodiment of the present invention, the light emitting device 10 may further include a light cover element 16 formed between the light guide layer 14 and the diffusion layer 15. The light cover element 16 of the present invention may be used to cover the bright spot on top of the light entering surface 142 so as to enhance the uniformity of outgoing light. In accordance with the present invention, the size of the light cover element 16 and the relative location may be adjusted based on the curve or curves of the light guide layer 14 to achieve the best lighting effect.

In one embodiment of the present invention, the light emitting device 10 may also include an air layer 17 formed on the light guide layer 14, as shown in FIG. 1. The air layer 17 of the present invention may be used to enhance luminance uniformity after the light passes through the diffusion layer 15. In a preferred embodiment, the air layer 17 is at least thicker than 0 mm.

In one embodiment of the present invention, the light emitting device 10 may include a carrier 18. In one embodiment, the carrier 18 of the present invention may carry the printed circuit board 11, the reflection layer 12, the light guide layer 14 and one or more light sources 12. However, the carrier 18 of the present invention may also carry the diffusion layer 15, the light cover element 16 and the air layer 17. The carrier 18 of the present invention may be made of a highly reflective material. Alternatively, the inner sides of the carrier 18 may include a reflection layer so as to improve leakage of light from the sides of the light guide layer 14, thereby improving the utilization of light.

In one embodiment of the present invention, the light emitting device 10 may be a vehicular light, such as a tail light, a brake light, a directional light, a reverse light, a daytime running light, a parking light, a license plate light and an indoor light, as described above. As shown in FIG. 1, when the present invention is utilized as a vehicular light, the light emitting device 10 may further include a protective housing 20 connecting a vehicle body 30 so as to cover the printed circuit board 11, the one or more light sources 12, the reflection layer 13 and the light guide layer 14. The protective housing 20 of the present invention may further include the diffusion layer 15, the light cover element 16, the air layer 17 and the carrier 18 so as to completely cover each element within the light emitting device 10. When the light emitting device 10 of the present invention is used as a vehicular light, a plurality of microstructures 141 of the same shape or different shapes may be arranged based on the shape of the protective housing 20. The plurality of microstructures 141 may be shaped with one or more curves so as to achieve the best lighting effect. As a result, the vehicular light emitting device 10 of the present invention may have a variety of modern designs and at the same time enhance luminance uniformity of the lighting effect.

While the invention has been described in conjunction with exemplary preferred embodiments, it is to be understood that many alternatives, modifications, and variations will be apparent to those skilled in the art in light of the foregoing description. Accordingly, the present invention embraces all such alternatives, modifications, and variations. All matters set forth herein or shown in the accompanying drawings are to be interpreted in an illustrative and non-limiting sense.

What is claimed is:

1. A light emitting device, comprising:
   a printed circuit board;
   a reflection layer formed on said printed circuit board;
   a light guide layer formed on said reflection layer; and
   one or more light sources provided on one or more sides of said light guide layer to allow light to enter said light guide layer from said one or more sides,
   wherein said light guide layer is bendable into curves of different sizes;
   wherein a plurality of microstructures is configured on said bendable light guide layer; and
   wherein the number of said plurality of microstructure with at least one round surface disposed on a large curve is more than the number of said plurality of microstructure with at least one flat surface disposed on said large curve, whereas the number of said plurality of microstructure with at least one round surface disposed on a small curve is less than the number of said plurality of microstructure with at least one flat surface disposed on said small curve.

2. The device of claim 1, wherein each of said plurality of microstructures has a protruding or concave shape.

3. The device of claim 1, wherein said plurality of microstructures has more than one three-dimensional shape.

4. The device of claim 1, further comprising a diffusion layer formed on said light guide layer.

5. The device of claim 4, further comprising a light cover element provided between said light guide layer and said diffusion layer.

6. The device of claim 1, wherein said one or more light sources are light emitting diodes (LEDs).

7. The device of claim 4, further comprising an air layer formed between said light guide layer and said diffusion layer.

8. The device of claim 1, further comprising a carrier for carrying said printed circuit board, said reflection layer, said light guide layer and said one or more light sources.

9. The device of claim 1, wherein said side of said light guide layer from which light enters has a concave shape.

10. The device of claim 1, wherein said device is installed in a motor vehicle body.

11. The device of claim 1, wherein said device is installed in an object emitting directional light.

12. The device of claim 4, further comprising a light enhancement layer formed on said diffusion layer.

13. The device of claim 4, further comprising a deflection layer formed on said diffusion layer.

14. A light emitting device, comprising:
   a printed circuit board;
   a reflection layer formed on said printed circuit board;
   a light guide layer formed on said reflection layer;
   one or more light sources provided on one or more sides of said light guide layer to allow light to enter said light guide layer from said one or more sides; and
   a bendable microstructure layer formed above or below said light guide layer,
   wherein said bendable microstructure layer has a plurality of microstructures on a surface thereof, each of said microstructures has a first shape or a second shape assembled next to each other on said surface based on an overall shape of said bendable microstructure layer, wherein said first shape has at least one curved surface and said second shape has at least one flat surface; and wherein the number of said microstructure with said first shape is disposed more in some portion of said bendable microstructure layer than the number of said microstructure with said second shape is disposed in said portion, whereas the number of said microstructure with said first shape is disposed less in the other portion of said bendable microstructure layer than the number of said microstructure with said second shape is disposed in said other portion.

15. The device of claim 14, wherein said bendable microstructure layer is affixed on a top surface or a bottom surface of said light guide layer.

16. The device of claim 14, wherein each of said plurality of microstructures has a protruding or concave shape.

17. The device of claim 14, wherein said plurality of microstructures has more than one three-dimensional shape.

18. The device of claim 14, further comprising a diffusion layer formed on said light guide layer.

19. The device of claim 18, further comprising a light cover element provided between said light guide layer and said diffusion layer.

20. The device of claim 14, wherein said one or more light sources are light emitting diodes (LEDs).

21. The device of claim 18, further comprising an air layer formed between said light guide layer and said diffusion layer.

22. The device of claim 14, further comprising a carrier for carrying said printed circuit board, said reflection layer, said one or more light sources, said bendable microstructure layer and said light guide layer.

23. The device of claim 14, wherein said side of said light guide layer from which light enters has a concave shape.

24. The device of claim 14, wherein said device is installed in a motor vehicle body.

25. The device of claim 14, wherein said device is installed in an object emitting directional light.

26. The device of claim 18, further comprising a light enhancement layer formed on said diffusion layer.

27. The device of claim 18, further comprising a deflection layer formed on said diffusion layer.

28. A vehicular light emitting device, comprising:
a printed circuit board electrically coupled to a vehicle body;
a reflection layer formed on said printed circuit board;
a light guide layer formed on said reflection layer;
one or more light sources provided on one or more sides of said light guide layer to allow light to enter said light guide layer from said one or more sides; and
a protective housing connecting said vehicle body to cover said printed circuit board, said reflection layer, said one or more light sources, and said light guide layer,
wherein said light guide layer is bendable into curves of different sizes;
wherein a plurality of microstructures is configured on said bendable light guide layer; and
wherein, depending on the size of said curves, the number of said plurality of microstructure with at least one round surface disposed thereon is different than the number of said plurality of microstructure with at least one flat surface so as to produce axially outgoing light in relation to said vehicular body.

29. The device of claim 28, wherein each of said plurality of microstructures has a protruding or concave shape.

30. The device of claim 28, wherein said plurality of microstructures has more than one three-dimensional shape.

31. The device of claim 28, further comprising a diffusion layer formed on said light guide layer and covered within said protective housing.

32. The device of claim 31, further comprising a light cover element provided between said light guide layer and said diffusion layer and covered within said protective housing.

33. The device of claim 28, wherein said one or more light sources are light emitting diodes (LEDs).

34. The device of claim 31, further comprising an air layer formed between said light guide layer and said diffusion layer.

35. The device of claim 28, further comprising a carrier for carrying said printed circuit board, said reflection layer, said light guide layer and said one or more light sources.

36. The device of claim 28, wherein said side of light guide layer from which light enters has a concave shape.

37. The device of claim 31, further comprising a light enhancement layer formed on said diffusion layer.

38. The device of claim 31, further comprising a deflection layer formed on said diffusion layer.

* * * * *